(12) United States Patent
Moriyama

(10) Patent No.: US 6,808,225 B2
(45) Date of Patent: Oct. 26, 2004

(54) DOUBLE DOOR CONSTRUCTION FOR VEHICLE

(75) Inventor: Yukihiro Moriyama, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/372,655

(22) Filed: Feb. 25, 2003

(65) Prior Publication Data

US 2003/0160476 A1 Aug. 28, 2003

(30) Foreign Application Priority Data

Feb. 27, 2002 (JP) ........................................ 2002-050839

(51) Int. Cl.$^7$ ................................................. B60J 5/04
(52) U.S. Cl. ............................. 296/146.6; 296/146.9; 296/187.12; 49/502
(58) Field of Search ................. 296/146.1, 146.5, 296/146.6, 146.9, 187.12, 202; 49/502

(56) References Cited

U.S. PATENT DOCUMENTS

| | | | | |
|---|---|---|---|---|
| 1,639,037 A | * | 8/1927 | Hollingshead | 296/202 X |
| 4,582,357 A | | 4/1986 | Nakamura et al. | |
| 5,364,157 A | * | 11/1994 | Siedlecki | 296/146.6 |
| 6,332,641 B1 | * | 12/2001 | Okana | 296/146.6 |
| 6,609,748 B1 | * | 8/2003 | Azzouz et al. | 296/146.1 |
| 6,612,639 B2 | * | 9/2003 | Ishikawa | 296/146.6 |
| 6,659,537 B2 | * | 12/2003 | Moriyama et al. | 296/146.6 |

FOREIGN PATENT DOCUMENTS

| | | |
|---|---|---|
| DE | 101 19 131 A1 | 11/2002 |
| EP | 1 068 970 A1 | 1/2001 |
| EP | 1 247 703 A1 | 10/2002 |
| JP | 10-250370 | 9/1998 |
| JP | 2001-138864 | 5/2001 |

OTHER PUBLICATIONS

Patent Abstract of Japan vol. 006, No. 109 (M–137), Jun. 19, 1982 & JP 57 041209 A (Nissan Motor Co Ltd.), Mar. 8, 1982, *Abstract*.
Patent Abstract of Japan vol. 2000, No. 22, Mar. 9, 2001 & JP 2001 138864 A (Toyota Autom Loom Works Ltd), May 22, 2001 *Abstract*.
European Search Report (Dated May 14, 2003).

* cited by examiner

*Primary Examiner*—Patricia L. Engle
(74) *Attorney, Agent, or Firm*—Nixon Peabody, LLP; Donald R. Studebaker

(57) ABSTRACT

A double door structure which has front and rear doors opening outward to form an uninterrupted opening to front and rear seats has an impact load carrying assembly for forming a side body reinforcing structure for protecting passengers against a side collision. The impact load carrying assembly includes an impact bar extending to and overlapping a side sill of a vehicle body, an upper bracket fixedly mounted to the impact bar and located to overlap a roof side rail of the vehicle body and a lower bracket fixedly mounted to the impact bar. The upper bracket mounts a latch and a belt anchor of a seatbelt system thereon and the lower bracket mounts catch pins forming part of a door catch mechanism operative to prevent movement of the door upon an occurrence of a side collision.

9 Claims, 8 Drawing Sheets

DOUBLE DOOR CONSTRUCTION FOR VEHICLE

BACKGROUND OF THE INVENTION

1. Field of the Invention

The present invention relates to a door construction for a vehicle provided with double doors that open outward to form a single uninterrupted doorway to front and rear seats which ensures strength of a side body against lateral external impact even though having no center pillars.

2. Description of Related Art

Motor vehicles with double doors, typically such as front and rear doors opening outward, provide a single doorway to front and rear seats when the double doors open. Such a motor vehicle has no center pillars and, in consequence, has need to be equipped with improved rigidity of a doorway structure and strength and rigidity of door units. As described in, for example, Japanese Unexamined Patent Publication No. 10-250370, one of general measures for improving strength and rigidity of a door unit is to provide the door unit with an impact load carrying bar extending in a lengthwise direction in an inside space of the door unit so as thereby to ensure strength of the side body against lateral external impact.

In addition, the motor vehicle having no center pillars is hard to ensure mounting rigidity of a functional member such as a seatbelt retractor. In order to eliminate this problem, it has been proposed in, for example, Japanese Unexamined Patent Publication No. 2001-138864 to mount upper and lower door locks to upper and lower front portions of a rear door, respectively, by the use of upper and lower mounting brackets, respectively. The upper mounting bracket is commonly used to mount a shoulder belt anchor of a front seat belt to the vehicle, and the lower mounting bracket is commonly used to mount both lap belt anchor and seat belt retractor of the front seat belt.

SUMMARY OF THE INVENTION

It is therefore an object of the present invention to provide a double door construction for a vehicle having no center pillars that ensures strength of a side body of the vehicle.

It is another object of the present invention to provide a double door construction for a vehicle having no center pillars that has no need to install additional reinforcing members for mounting functional devices or members such as a retractor of a seat belt to a door.

The aforesaid objects of the present invention is accomplished by a double door construction for a vehicle having front and rear doors opening outward to provide a single uninterrupted opening which comprises vertical impact load carrying means installed to at least one of the front door and the rear door and extending substantially vertically along an end of the door opposite to an end at which the door is pivotally mounted to a vehicle body.

The impact load carrying means at either one or both of upper and lower end portions desirably overlaps a rigid stationary portion forming side part of a vehicle body. The double door construction thus constructed cooperates with a side body of the vehicle thereby to provide improved side body strength against lateral impact upon an occurrence of a lateral collision of the vehicle.

Specifically, the impact load carrying means desirably comprises an impact bar and a bracket fixedly attached to each of the upper and lower end portions of the impact bar through which the impact bar is rigidly fixed to the door. The bracket can be used to mount a functional member or members of a mechanism or a system operative to protect passengers, such as a door latch of a door lock mechanism, catch pins of a door catch mechanism operative to prevent movement of the door upon an occurrence of a side collision, or a belt anchor of a seatbelt system, without installing extra reinforcements for mounting these functional members.

The door and the reinforcement are desirably made of aluminum. On the other hand, the impact load carrying means is desirably made of iron metal and, more specifically, comprises an impact bar made of high-strength steel and brackets made of iron. When the double door is constructed by the use of structural members made of different materials, the door to which the impact load carrying means is installed is provided with an aluminum reinforcement extending along with the impact load carrying means and coupling means for mechanically coupling the impact load carrying means and the reinforcement together so as thereby to absorb relative displacement between the impact load carrying means and the reinforcement due to differences in thermal expansion of them during manufacturing process, e.g. a painting and drying process, of the door.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

In the following description, the term "outer side" as used herein shall mean and refer to the side on the exterior of the vehicle body and the term "inner side" as used herein shall mean and refer to the side on the interior of the vehicle body.

Figure 1:
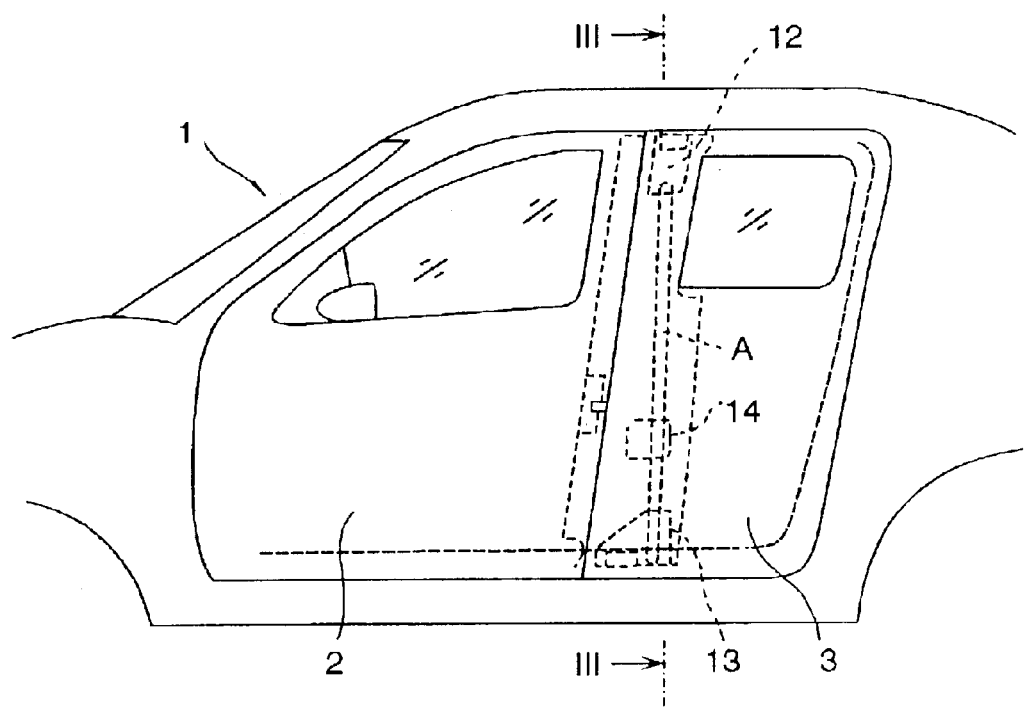
FIG. 1 is a side view of part of a vehicle with an outward opening double door according to an embodiment of the present invention.

Referring to the drawings in detail, and, more particularly, to FIG. 1 showing part of a vehicle body 1, the vehicle body 1 is equipped with an outward opening type of double doors, namely front and rear doors 2 and 3, according to an embodiment of the present invention. A similar pair of doors (not shown) are provided on the opposite side of the vehicle body 1. The front door 2 at a front end is pivotally mounted to the vehicle body 1 by hinges (not shown). The rear door 3 at a rear end is pivotally mounted to the vehicle body 1 by hinges (not shown). These front and rear doors 2 and 3 open outward in opposite directions to provide a single uninterrupted opening, i.e. a doorway through which front and rear seats are accessed, in a side body portion of the vehicle body 1. In other words, the vehicle body 1 has no center pillars and provides a single uninterrupted opening that is not divided into two openings to front and rear passenger seats, respectively, when the front and rear doors 2 and 3 open.

Figure 2:
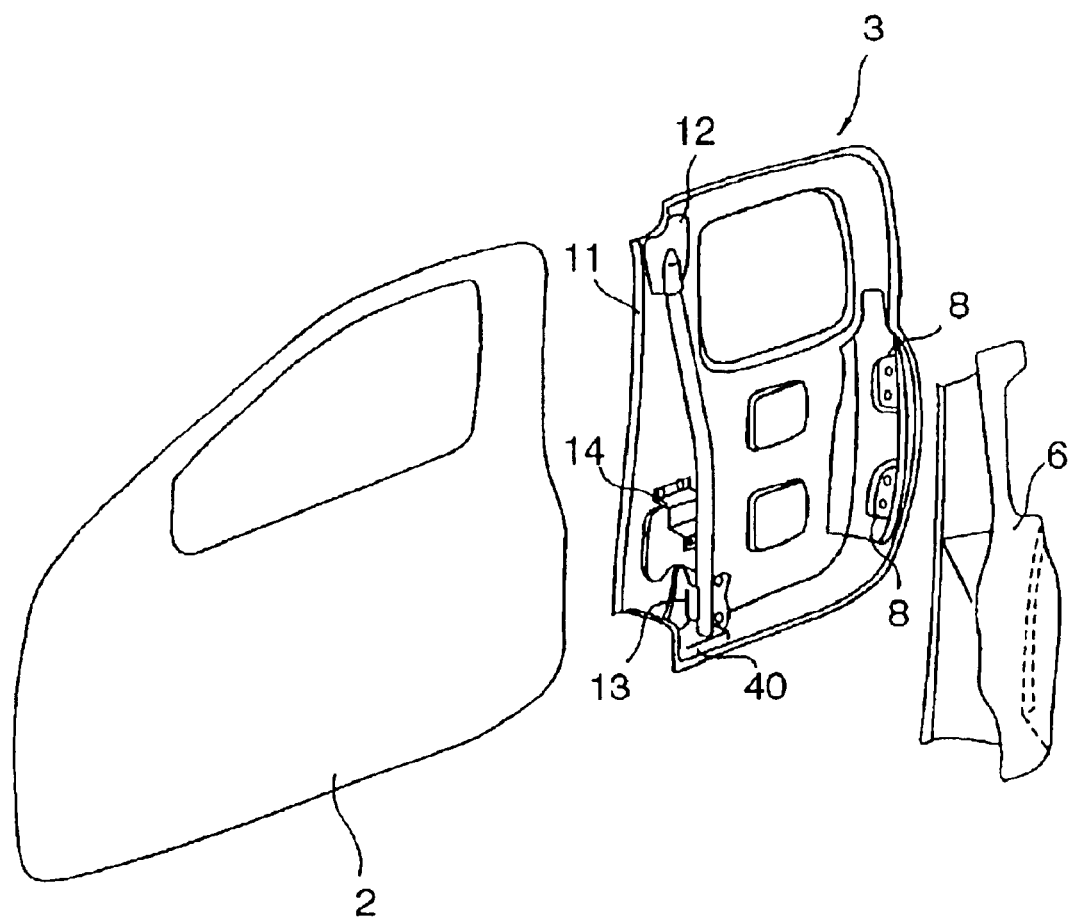
FIG. 2 is a schematic view of a rear door with a door outer panel removed.

FIG. 2 schematically shows the rear door 3 with a door outer panel removed. As shown, the rear door 3 is pivotally mounted at its rear end portion to the vehicle body 1 through a pair of hinge attachments 8 and equipped at its front end with an impact load carrying assembly A extending vertically and a vertical reinforcement 6. The vertical reinforcement 6 at its inner side is provided with a horizontal impact bar 7 (see FIG. 3) extending in a lengthwise direction of the vehicle body 1 from the front to the back. The impact load carrying assembly A desirably extends vertically.

Figure 3:
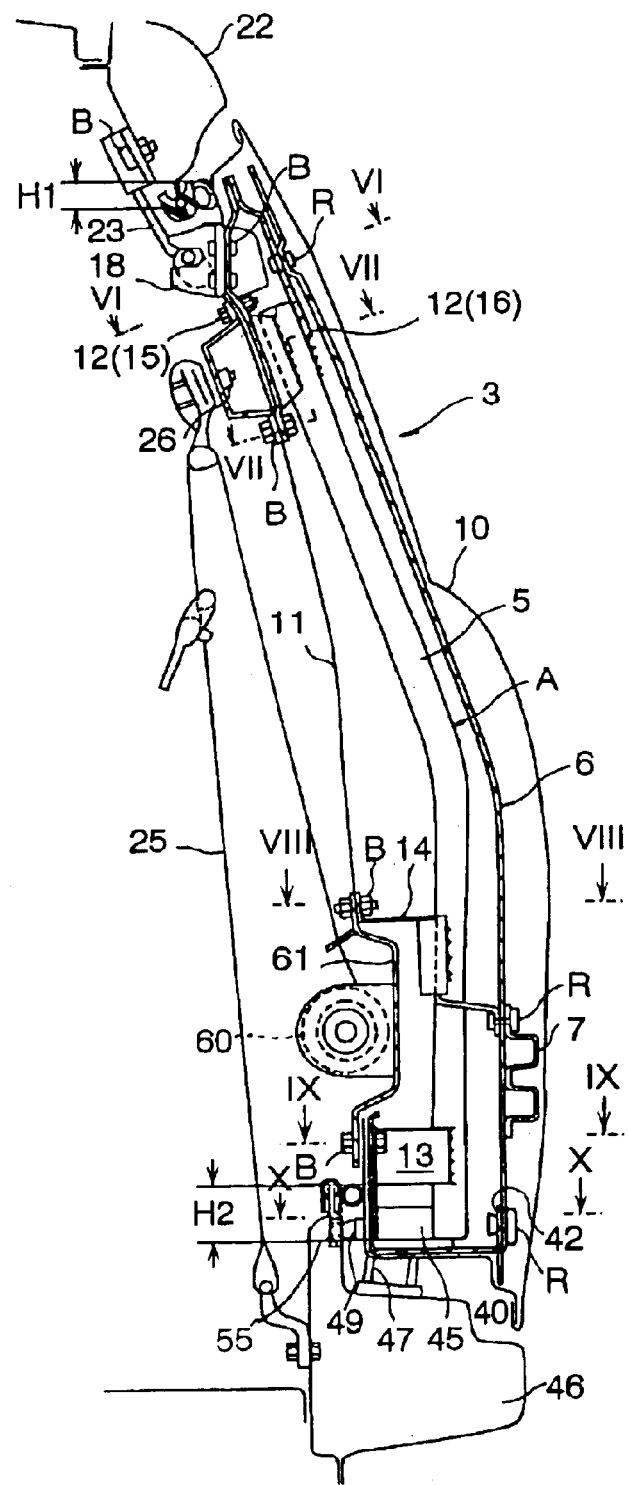
FIG. 3 is a cross-sectional view of the vehicle taken along line III—III of FIG. 1.
Figure 4:
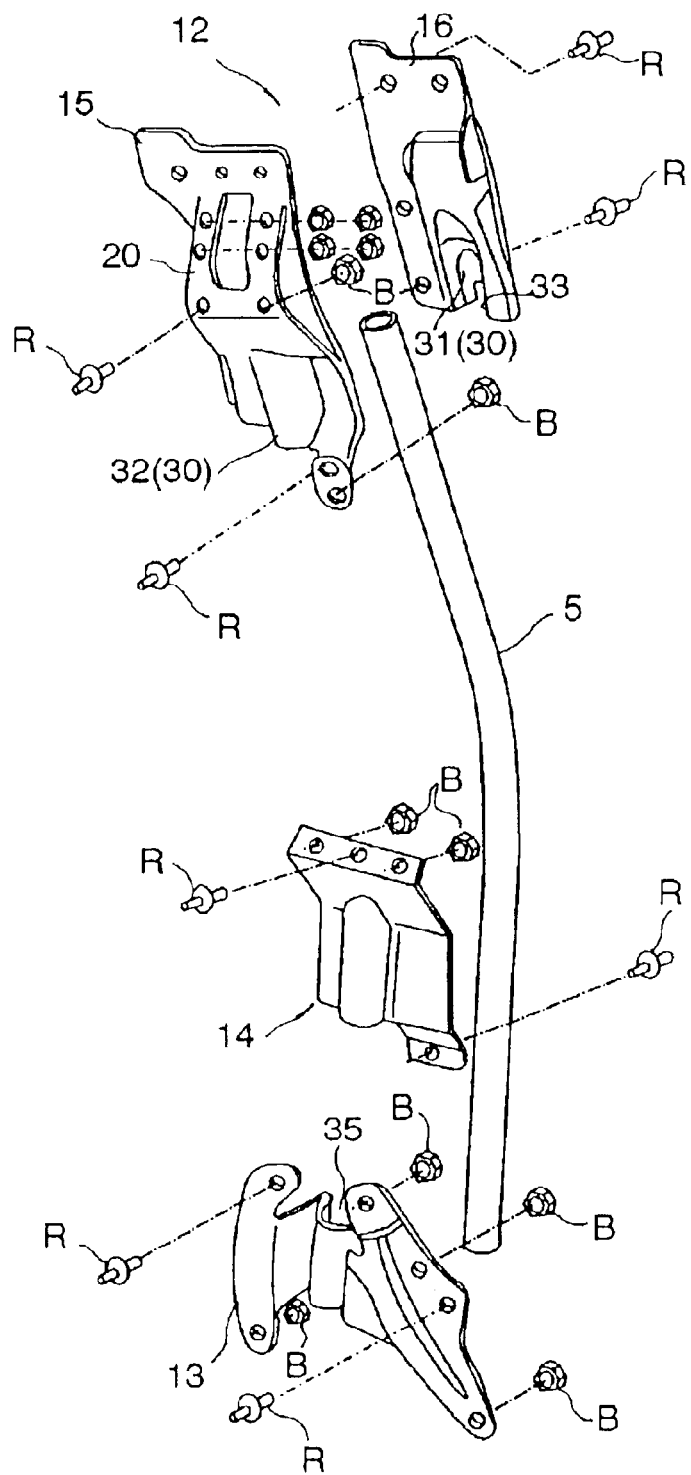
FIG. 4 is an exploded view of an impact load carrying assembly.

Referring to FIGS. 3 and 4 showing the vehicle body 1 in vertical cross section of FIG. 1 along line III—III and the impact load carrying assembly A including an impact bar and upper, middle and lower brackets, respectively. As shown in FIG. 3, the rear door 3 comprises door outer and door inner panels 10 and 11 like conventional doors. These door outer and door inner panels 10 and 11 are configured to provide an internal space therebetween when assembled. In the space at its front portion there are arranged a vertical reinforcement 6 and an impact bar 5 of the impact load carrying assembly A in order from the door outer panel 10 to the door inner panel 11. The impact bar 5 is secured to the vertical reinforcement 6 through upper, intermediate and lower brackets 12, 14 and 13. In this instance, the impact bar 5 is desirably made of a high-strength steel pipe, the brackets 12, 13 and 14 are desirably made of one of ferrous metals and each of the door outer panel 10, the door inner panel 11, and the vertical reinforcement 6 are desirably aluminum parts.

The upper bracket 12 comprises an inner bracket member 15 located on the side of the door inner panel 11 and an outer bracket member 16 located on the side of the door outer panel 10. These inner and outer brackets members 15 and 16 are joined to each other by a plurality of rivets R and a plurality of bolt-and-nut fixing means B (only nuts are shown in FIG. 4) so as thereby to have a firm grasp on the top end portion of the impact bar 5. The rivets R further couples the bracket 12 and the vertical reinforcement 6 together. The rivets R are desirably aluminum parts.

The upper bracket 12 has a shape extending vertically. The inner bracket member 15 at its upper portion has a mounting seat 20 to which an upper latch 18 forming a part of an upper door lock mechanism (not shown) is fixed by the bolt-and-nut fixing means B. In this instance, the upper door lock mechanism comprises the upper latch 18 fixed to the upper bracket 12 of the rear door 3 and an upper striker 23 bolted to a roof side rail 22 forming upper part of the vehicle body 1 and operates such that, when the rear door 3 closes, the upper latch 18 is brought into engagement with the upper striker 23 so as thereby to lock the rear door 3 in the closed position. The inner bracket member 15 at its lower portion has a mounting seat 28 to which a bracket 27 is bolted. The bracket 27 is used to fix an anchor 26 of a shoulder belt of a rear seat belt 25 (see FIG. 5).

As clearly shown in FIGS. 3 an 5, the upper bracket 12 has a cylindrical installing bore 30 that is shaped so as to fit the top end portion of the impact bar 5. The cylindrical installing bore 30 is made up of two mating bore halves 32 and 31 formed in the inner and outer bracket members 15 and 16, respectively, in, for example, press working. The mating bore halve 31 has a cutout 33. When assembling the upper bracket 12 to the impact bar 5, the impact bar 5 at the top end portion is seated in and welded to the mating bore half 32 of the inner bracket member 15. Thereafter, the outer bracket member 16 is fitted and bolted to inner bracket member 15 and then welded the impact bar 5 at the cutout 33.

Figure 5:
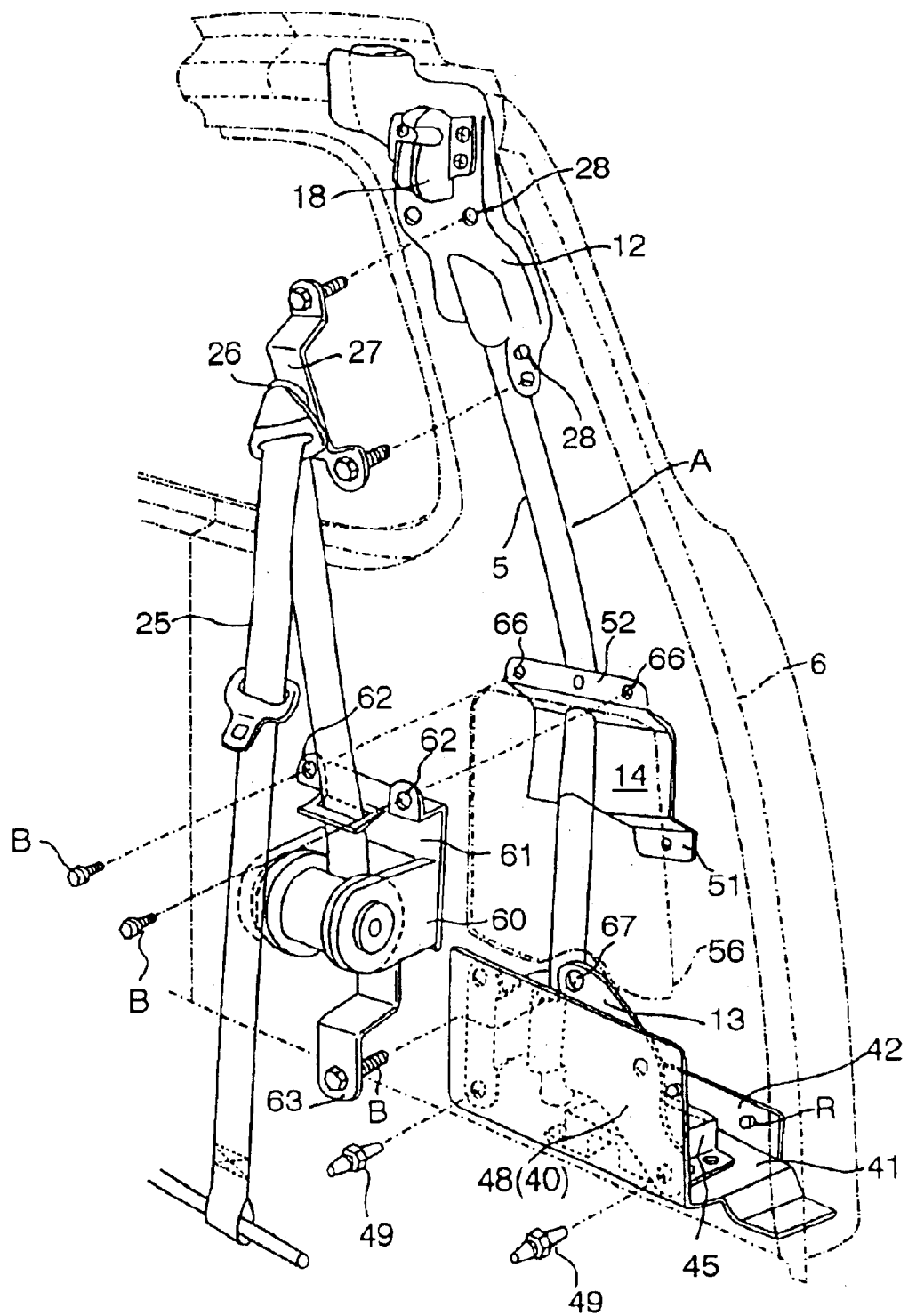
FIG. 5 is a view of an interior of the rear door where internal door mechanisms and various functional door parts are installed.
Figure 6:
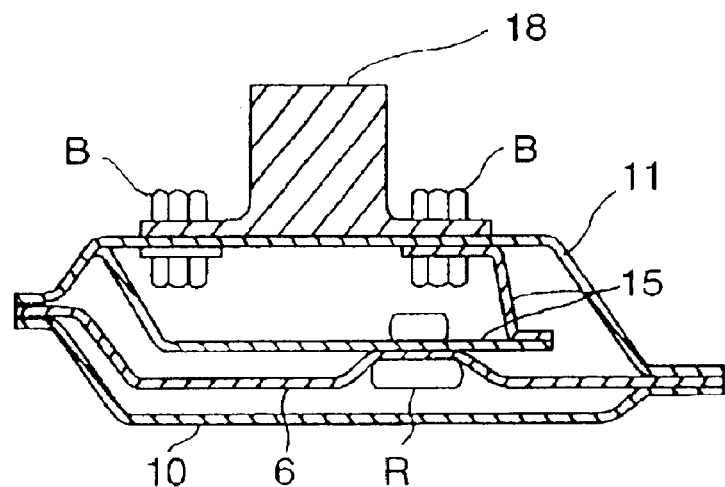
FIG. 6 is a cross sectional view of the vehicle taken along line VI—VI of FIG. 3.
Figure 7:
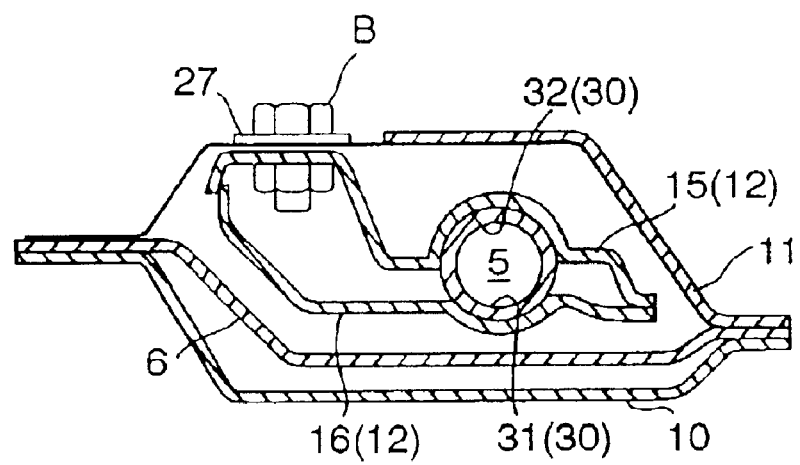
FIG. 7 is a cross sectional view of the vehicle taken along line VII—VII of FIG. 3.
Figure 8:
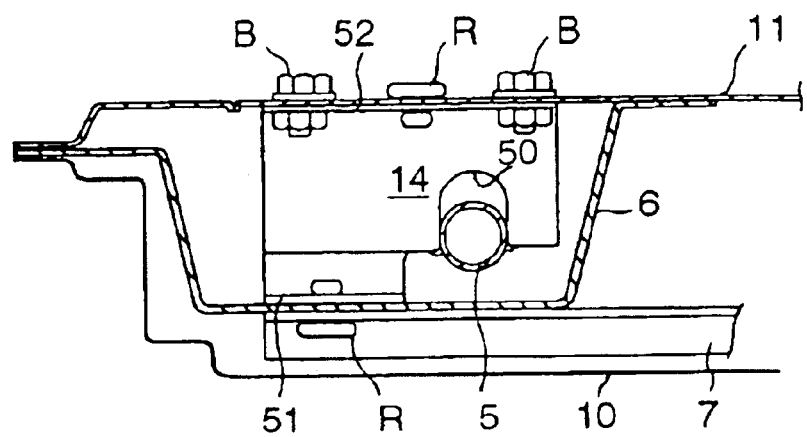
FIG. 8 is a cross sectional view of the vehicle taken along line VIII—VIII of FIG. 3.
Figure 9:
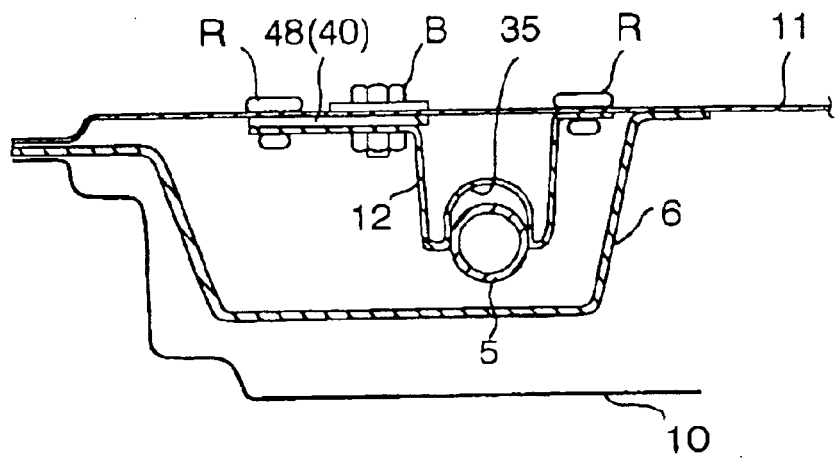
FIG. 9 is a cross sectional view of the vehicle taken along line IX—IX of FIG. 3.
Figure 10:
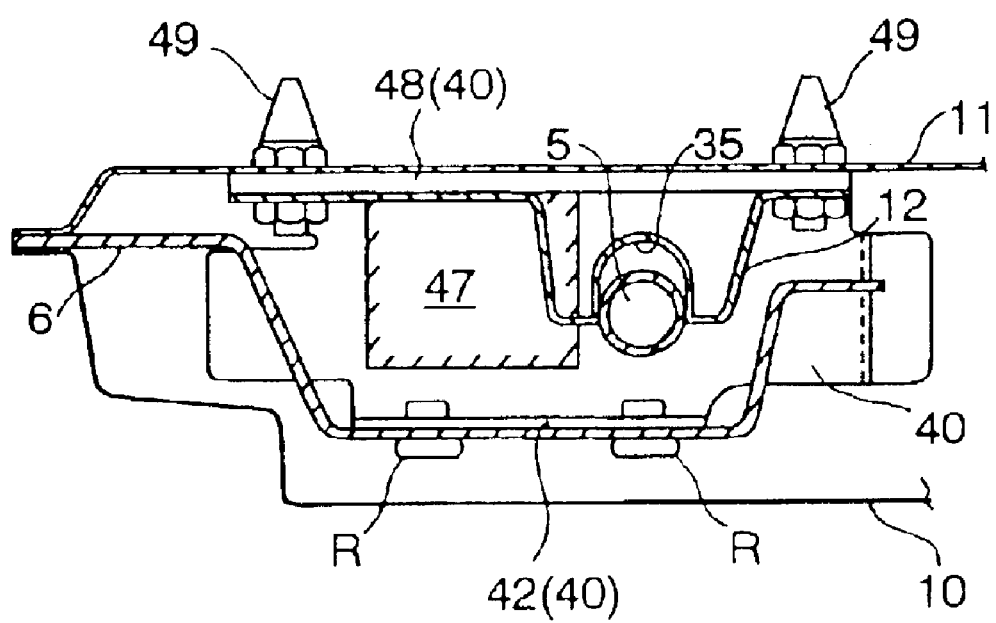
FIG. 10 is a cross sectional view of the vehicle taken along line X—X of FIG. 3.

The lower bracket 13 is fixedly mounted to a generally U-shaped lower latch reinforcement 40 and the door inner panel 11 by a plurality of rivets R and a plurality of bolt-and-nut fixing means B (see FIGS. 5 and 9). Specifically, the U-shaped lower latch reinforcement 40 comprises a base 41, an outer flange 42 bent straight up and an inner flange 48 bent straight up and provided with a pair of catch pins 49 secured thereto. The catch pins 49 are separated with a specified lengthwise distance. The outer flange 42 is secured to a lower end portion of the vertical reinforcement 6 by a plurality of rivets R as shown in FIG. 5. The inner flange 48 overlaps the lower bracket 13. The lower latch reinforcement 40 forms a part of a lower door lock mechanism comprising a lower latch 45 and a lower striker 47. The lower latch 45 is fixedly mounted to the lower latch reinforcement 40, and the lower striker 47 is bolted to a side shell 46 forming lower part of the vehicle body 1. The lower door lock mechanism operates such that, when the rear door 3 closes, the lower latch 45 is brought into engagement with the lower striker 47 so as thereby to lock the rear door 3 in the closed position. Simultaneously, when the rear door 3 closes, the catch pins 49 enters positioning holes 55 formed in a side sill 46 at the same lengthwise distance as the specified lengthwise distance so as thereby to prevent the rear door 3 from being displaced upon an occurrence of a lateral collision.

The lower bracket 13 is a single piece disposed on the inner side of a lower portion of the impact bar 5 and fixedly sustaining the lower portion of the impact bar 5. Specifically, the lower bracket 13 is formed in press working so as to have a substantially vertical sustention groove 35 having a semi-circular cross section.

The intermediate bracket 14 is a single piece disposed on the inner side of an intermediate portion of the impact bar 5 and fixedly sustaining the intermediate portion of the impact bar 5. Specifically, the intermediate bracket 14 is formed in press working so that it has a shape stretched over between the door inner panel 11 and the vertical reinforcement 6 and is provided with a substantially vertical sustention groove 50 having a semi-circular cross section formed in a vertical main portion and lower outer and upper inner flanges 51 and 52 at opposite ends of the main portion.

The impact bar 5 is welded to the intermediate bracket 14 with the intermediate portion of the impact bar seated in the vertical groove 50 and, thereafter, installed to the rear door 3 by riveting the lower outer flange 51 to the vertical reinforcement 6 and riveting and bolting the upper inner flange 52 to the door inner panel 11.

As shown in FIG. 5, the door inner panel 11 has an opening 56 formed in a position between the lower bracket 13 and the intermediate bracket 14. This opening 56 receives a seat belt retractor 60 fixedly mounted to a mounting bracket 61. The mounting bracket 61 has upper and lower tongues 62 and 63 with fixing bolt holes (lower tongues are hidden in FIG. 5—bolt B and hole 67) and is fixedly mounted to the lower and intermediate brackets 13 and 14 by fastening fixing bolts B into threaded bolt holes 66 formed in the upper inner flange 52 of the intermediate bracket 14 and a threaded both hole 67 formed in the lower bracket 13.

The impact bar 5 and the upper and lower brackets 12 and 13 are coupled together and operate as one integral structure of reinforcement against lateral collisions. As shown in detail in FIG. 3, the upper bracket 12 at its top portion overlaps the roof side rail 22 forming upper part of the vehicle body 1 by a vertical distance H1. The impact bar 5 at its lower portion overlaps the side shell 46 forming lower part of the vehicle body 1 by a vertical distance H2. The impact bar at its upper and lower portions overlaps upper and lower rigid body members, i.e. the roof side rail 22 and the side shell 46, so as to provide ensured strength of the side body against lateral impact. However, the impact bar 5 may overlap either one of the roof side rail 22 and the side shell 46. In this instance, the body portion that is not overlapped by impact bar 5 is protected against lateral impact by component parts of the door lock mechanism. Further, since both upper door latch 18 of the upper door lock mechanism and shoulder belt anchor 26 are fixedly mounted to the upper bracket 12 united with the impact bar 5, it is not necessary to install extra reinforcements for these functional parts associated to the rear door 3. Similarly, the seat belt retractor 60, the catch pins 49 and the lower latch of the lower door lock mechanism are fixedly mounted to the lower and intermediate bracket 13 and 14 and the lower latch reinforcement 40, respectively, it is not necessary to install extra reinforcements for these functional parts associated to the rear door 3.

As was previously described, since the rear door 3 comprises various structural parts made of different materials that include at least aluminum panels such as the door inner panel 11, high-strength steel pipes such as the impact bar 5 and iron bracket parts such as the brackets 12, 13 and 14. Therefore, in an assembling line of the rear door, in order for a door assembly to absorb relative displacement between structural parts due to differences in thermal expansion in a painting and drying process, an unpainted door assembly is left with mutually associated parts temporarily coupled together by rivets R and fixed to one another loosely by bolt-and-nut fixing means B before the painting and drying process and completely fixed to a rear door by tightly fastening bolt-and-nut fixing means B after the painting and drying process.

In the case where the impact bar 5 has a curved configuration as shown in FIG. 4, in order to be immune to individual differences in curvature of impact bars, each of the intermediate and lower brackets 13 and 14 is desirable to have a semi-circular sustention groove 35, 50 with a radius greater than a specification radius of the impact bar 5.

As just described in detain in connection with a door construction by way of desired example, the impact bar 5 may be incorporated in the front door 5, in particular a rear end portion of the front door 2, in place of the rear door 3. Furthermore, a horizontal impact bar may be incorporated either the front door 2 or the rear door 3 in addition to the vertical impact bar 5. The door construction of the present invention is applied to a sliding rear door that slides back and forth and a gull-wing rear door with the same effect.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A double door construction for a vehicle having front and rear doors opening outward to provide a single uninterrupted opening to front and rear seats and is provided with a passenger protective mechanism, said double door construction including an impact load carrying structure that is installed to at least one of said front door and said rear door and has at least one of upper and lower end portions that overlaps a rigid stationary part of a side body of said vehicle body, said impact load carrying structure comprising:

an impact bar extending substantially vertically along an end of said door opposite to an end at which said door is pivotally mounted to a vehicle body;

a bracket fixedly attached to each of upper and lower end portions of said impact bar through which said impact bar is rigidly fixed to said door, at least one of said brackets mounting a functional member of said passenger protective mechanism thereon.

2. A double door construction as defined in claim 1, wherein said functional member is one of parts of a door latch mechanism.

3. A double door construction as defined in claim 1, wherein said functional member is one of parts of a seatbelt system.

4. A double door construction as defined in claim 1, wherein said functional member is one of parts of a door catch mechanism for engage with said door so as to prevent said door from being displaced upon an occurrence of a lateral collision of said vehicle.

5. A double door construction as defined in claim 1, wherein that said door is provided with a reinforcement extending along with said impact load carrying structure and coupling structure for coupling said impact load carrying structure and said reinforcement together so as to absorb relative displacement between said impact load carrying structure, and said reinforcement due to differences in thermal expansion during manufacturing said door.

6. A double door construction as defined in claim 5, wherein each of said door and said reinforcement is made of aluminum and said impact load carrying means is made of iron metal.

7. A double door construction as defined in claim 6, wherein said impact bar is made of high-strength steel.

8. A double door construction as defined in claim 6, wherein said coupling means comprises an aluminum rivet.

9. A double door construction for a vehicle which has front and rear doors opening outward to provide single uninterrupted opening to front and rear sears, said double door construction including impact load carrying structure installed to at least one of said front door and said rear door and having at least either one of upper and lower end portions that overlaps a rigid stationary part of a side body of said vehicle body, said impact load carrying structure comprising:

an impact bar extending substantially vertically along an end of said door opposite to an end at which said door is pivotally hinged to a vehicle body;

a bracket fixedly attached to each of upper and lower end portions of said impact bar through which said impact bar is rigidly fixed to said door; and a reinforcement extending substantially vertically along said impact bar and coupled to said impact bar through said bracket.

* * * * *